United States Patent [19]

Hazelton

[11] Patent Number: 4,730,638
[45] Date of Patent: Mar. 15, 1988

[54] COMBINATION AUTOMATIC AND MANUAL BLEED VALVE

[76] Inventor: Carl Hazelton, 23 MacDonald Ave., Amityville, N.Y. 11701

[21] Appl. No.: 15,809

[22] Filed: Feb. 17, 1987

[51] Int. Cl.⁴ .............................................. F16K 24/00
[52] U.S. Cl. .................................................. 137/202
[58] Field of Search ............... 137/200, 197, 199, 181; 251/215, 122

[56] References Cited

U.S. PATENT DOCUMENTS

| 722,400 | 3/1903 | Chapman | 137/181 X |
| 1,753,833 | 4/1930 | Mueller | 251/215 |
| 2,601,216 | 6/1952 | White | 137/197 |
| 2,633,142 | 3/1953 | Woolley | 137/202 |
| 3,796,227 | 3/1974 | Fujiwara | 137/202 |
| 3,888,274 | 6/1975 | Weston | 137/202 X |

Primary Examiner—Alan Cohan
Attorney, Agent, or Firm—Michael I. Kroll

[57] ABSTRACT

A combination automatic and manual bleed valve is provided and consists of adding a manual air bleed fitting into a standard automatic bleed fitting so that if the automatic bleed fitting fails the manual air bleed fitting can be used to release air therefrom. The valve also contains a removable cover so that the valve can be rebuilt in place without removal of the valve from the heating system.

1 Claim, 3 Drawing Figures

U.S. Patent    Mar. 15, 1988    4,730,638
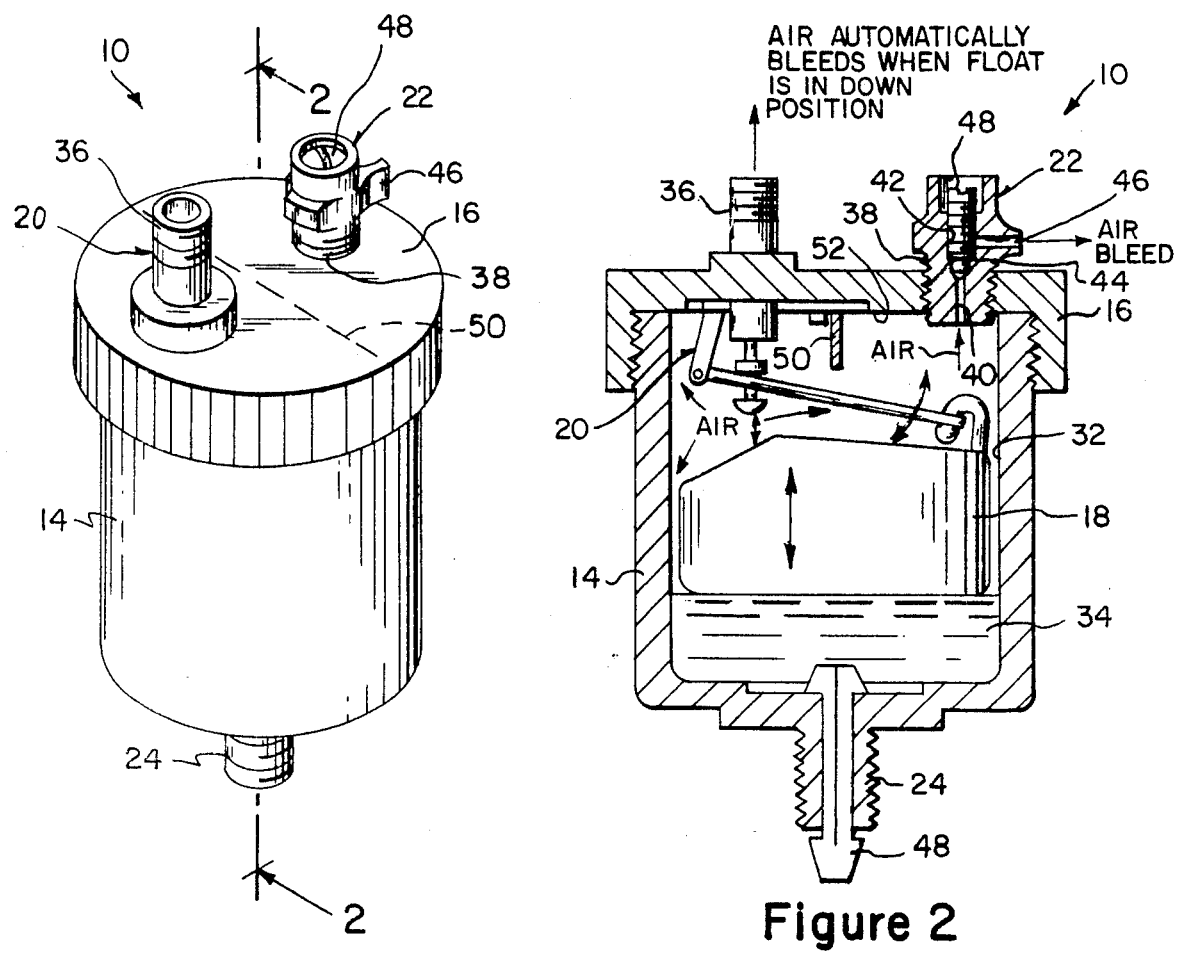
Figure 1
Figure 2
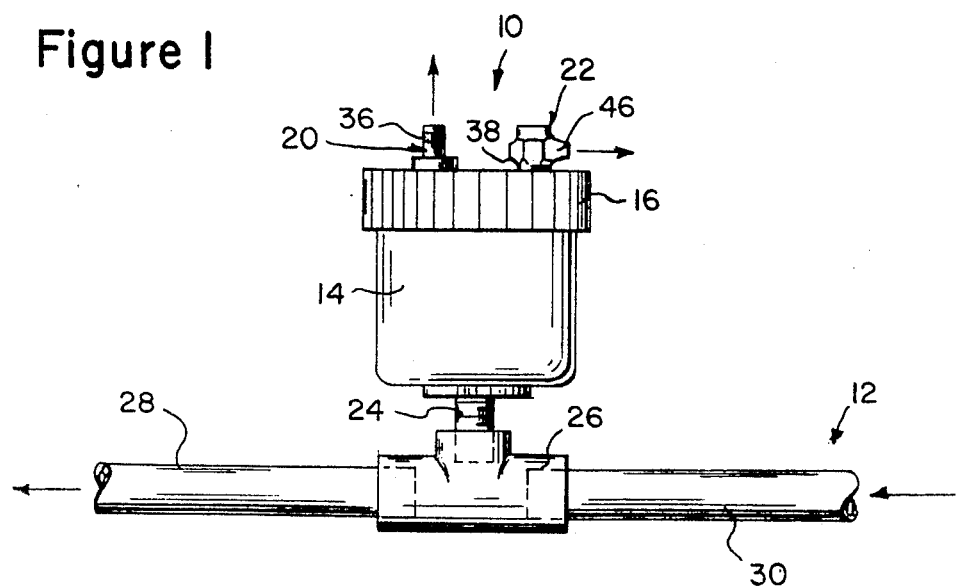
Figure 3

COMBINATION AUTOMATIC AND MANUAL BLEED VALVE

BACKGROUND OF THE INVENTION

1. Field of the Invention

The instant invention relates generally to air vent valves and more specifically it relates to a combination automatic and manual bleed valve for a hot water heating system.

Hot water heating consists of the circulation of hot water from a central heater through pipes to radiators and back to the heater. A centrifugal circulating pump is the usual motive power. The entire system, boiler, pipes and radiators is full of water under slight pressure to avoid the formation of air at the usual operating temperature for radiators of 208° F. Vents keep the system free of air.

2. Description of the Prior Art

Air must be eliminated from hot water heating systems or they will become air-bound and sluggish in flow. High point in the main pipe is vented by an automatic vent valve. Each radiator is vented at the top where the air collects by a manual or an automatic vent valve. Manual vent valves are purge cocks which must be opened to let out the air periodically during the heating season.

SUMMARY OF THE INVENTION

A primary object of the present invention is to provide a combination automatic and manual bleed valve that will overcome the shortcomings of the prior art devices.

Another object is to provide a combination automatic and manual bleed valve that consists of adding a manual air bleed fitting into a standard automatic bleed fitting so that if the automatic bleed fitting fails the manual air bleed fitting can be used to release air therefrom.

An additional object is to provide a combination automatic and manual bleed valve that can be rebuilt in place without removal of the valve from the heating system.

A further object is to provide a combination automatic and manual bleed valve that is simple and easy to use.

A still further object is to provide a combination automatic and manual bleed valve that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

FIG. 1 is a perspective view of the invention. FIG. 2 is a cross sectional view taken along line 2—2 in FIG. 1 showing the internal mechanism therein. FIG. 3 is a front view of the invention installed on the main line of a hot water heating system.

DETAILED DESCRIPTION OF THE PREFERRED EMBODIMENTS

Turning now descriptively to the drawings, in which similar reference characters denote similar elements throughout the several views, FIGS. 1 through 3 illustrates a combination automatic and manual bleed valve 10 for a hot water heating system 12. The valve 10 consists of a housing 14, a cover 16, a float 18, an automatic air bleed fitting 20 and mechanism 22 for manually releasing air.

The housing 14 has an externally threaded inlet port 24 to be connected to the system 12 as typically shown in FIG. 3 to a T-connector 26 between pipes 28 and 30. The housing 14 also has a chamber 32 for holding water 34 therein. The cover 16 is threadably connected to top of the housing 14 so that access to within the valve 10 can be accomplished while the valve 10 is still connected to the system 12. The float 18 is within the housing 14 to sit upon top of the water 34.

The automatic air bleed fitting 20 has an outlet port 36, is mounted on the cover 16 and is mechanically connected to the float 18 so that when the water 34 is low and the float 18 is in a down position the automatic air bleed fitting 20 will open to allow air within the chamber 32 to exit through the outlet port 36. The mechanism 22 can manually release the air from the chamber 32 of the housing 14 when the automatic air bleed fitting 20 fails to operate.

The mechanism 22 is a manual air bleed fitting and consists of an externally threaded sleeve 38 that has an internal bore 40 with a threaded portion 42, a seat 44 therein and a transverse outlet port 46 extending from the threaded portion 42 of the internal bore 40. The sleeve 38 is threaded into the cover 16. A bleed screw 48 is threaded into the threaded portion 42 of the internal bore 40 to engage with the seat 44 so that when the screw 48 is manually loosened away from the seat 44 the air from within the chamber 32 of the housing 14 will be released through the transverse outlet port 46.

A tongue member 48 is mounted securely within the inlet port 24 of the housing 14 to keep the inlet port clear of any sediment within the hot water heating system 12 from entering the chamber 32 of the housing 14 and clogging the valve 10.

A dividing strip 50 is mounted to underside 52 of the cover 16 between the automatic air bleed fitting 20 and the manual air bleed fitting 22 so as to make the automatic air bleed fitting air bound when the water is high thus preventing corosion to the automatic air bleed fitting 20.

The valve 10 may be used on feed and return lines, on high point over a boiler as an automatic air purge and in baseboard convectors on monoflow hot water heating systems. The manual air bleed fitting 22 is much cleaner and easier to use when the automatic fitting 20 is not functional. The manual air bleed fitting 22 can easily purge the lines and quickly break the vacuum in the system 12.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. A combination automatic and manual bleed valve for a hot water heating system comprising:
    (a) a housing having an externally threaded inlet port to be connected to said system and a chamber for holding water therein;

(b) a cover threadably connected to top of said housing so that access to within said valve can be accomplished while said valve is still connected to said system;

(c) a float within said housing to sit upon top of said water;

(d) an automatic air bleed fitting having an outlet port, said automatic bleed fitting mounted on said cover and mechanically connected to said float so that when said water is low and said float is in a down position said automatic air bleed fitting will open to allow air within said chamber to exit through said outlet port;

(e) means for manually releasing said air from said chamber of said housing when said automatic air bleed fitting fails to operate, said manually releasing menas is a manual air bleed fitting including an externally threaded sleeve having an internal bore with a threaded portion, a seat therein and a transverse outlet port extending from said threaded portion of said internal bore, said sleeve being threaded into said cover, and a bleed screw threaded into said threaded portion of said internal bore to engage with said seat so that when said screw is manually loosened away from said seat, said air from within said chamber of said housing will be released through said transverse outlet port;

(f) a tongue member mounted securely within said inlet port of said housing to keep said inlet port clear of any sediment within said hot water heating system from entering said chamber of said housing and clogging said valve; and (g) a dividing strip mounted to underside of said cover between said automatic air bleed fitting and said manual air bleed fitting so as to make said automatic air bleed fitting air bound when said water is high thus preventing corrosion to said automatic air bleed fitting.

* * * * *